(12) United States Patent
Chandran et al.

(10) Patent No.: US 11,847,816 B2
(45) Date of Patent: Dec. 19, 2023

(54) RESOURCE OPTIMIZATION BASED ON VIDEO FRAME ANALYSIS

(71) Applicant: Intel Corporation, Santa Clara, CA (US)

(72) Inventors: Pravin Chander Chandran, Bangalore (IN); Raghavendra Bhat, Bangalore (IN); Sean J. Lawrence, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 676 days.

(21) Appl. No.: 16/900,137

(22) Filed: Jun. 12, 2020

(65) Prior Publication Data

US 2020/0380261 A1 Dec. 3, 2020

(51) Int. Cl.
*G06V 10/764* (2022.01)
*G06N 3/08* (2023.01)
*G06V 20/40* (2022.01)
*G06F 18/214* (2023.01)
*G06V 10/82* (2022.01)

(52) U.S. Cl.
CPC .......... *G06V 10/764* (2022.01); *G06F 18/214* (2023.01); *G06N 3/08* (2013.01); *G06V 10/82* (2022.01); *G06V 20/41* (2022.01); *G06V 20/46* (2022.01); *G06V 20/44* (2022.01)

(58) Field of Classification Search
None
See application file for complete search history.

(56) References Cited

U.S. PATENT DOCUMENTS

2018/0357490 A1* 12/2018 Mitra .................. G06V 10/764

OTHER PUBLICATIONS

Yokoyama, T. et al., "Motion Vector Based Moving Object Detection and Tracking in MPEG Compressed Domain", 2009 Seventh International Workshop on Content-Based Multimedia Indexing, 2009 IEEE, 6 pages.

(Continued)

*Primary Examiner* — Leon Flores
(74) *Attorney, Agent, or Firm* — HANLEY, FLIGHT & ZIMMERMAN, LLC

(57) ABSTRACT

Techniques are provided for processing video frames in a process flow that includes first and second computation engines. In an example, the first engine is an artificial intelligence based computation engine, and the second engine is a heuristics-based computation engine. A sequence of frames of a video includes a first and second frames that are two consecutive frames in the sequence. An analyzer determines whether the second frame has non-redundant information relative to the first frame. In response to the determination, the analyzer selects one of the first or second engine for processing at least a section of the second frame. For example, if the second frame has non-redundant information relative to the first frame, at least the section of the second frame is processed by the first engine. If the second frame does not include non-redundant information, the second frame is processed by the second engine.

20 Claims, 10 Drawing Sheets

(56) References Cited

OTHER PUBLICATIONS

Mehmood, K. et al., "Fast Object Tracking in Compressed Videos for Real Time Surveillance Video Analysis", retrieved from the Internet: https://pdfs.semanticscholar.org/8986/224fdb67-f362cf83e34d78af094e982ef75e.pdf May 16, 2020, 6 pages.

Jain, S. and J.E. Gonzalez, "Fast Semantic Segmentation on Video Using Motion Vector-Based Feature Interpolation", arXiv:1803.07742v1, Mar. 21, 2018, 16 pages.

* cited by examiner

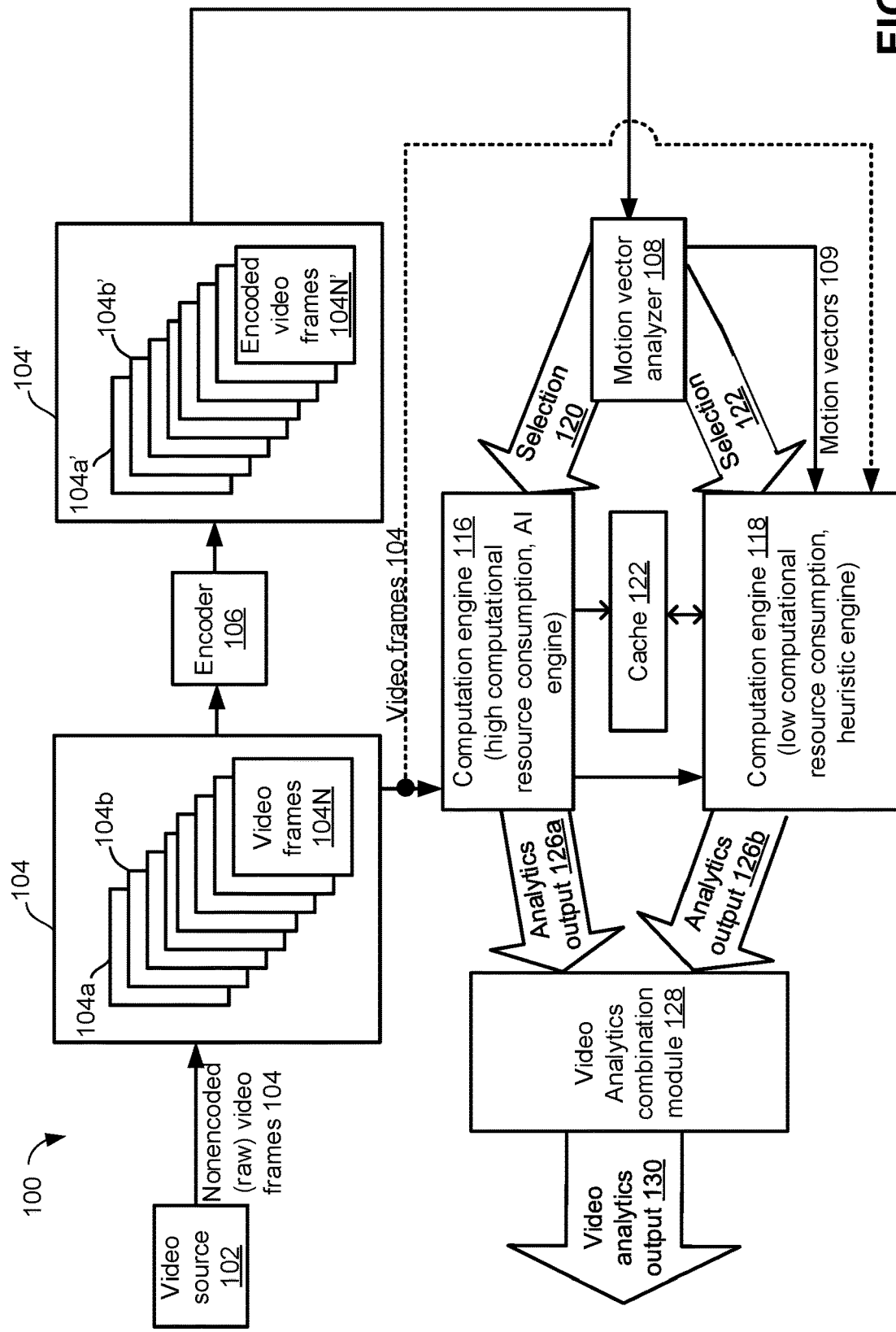

RESOURCE OPTIMIZATION BASED ON VIDEO FRAME ANALYSIS

BACKGROUND

Artificial intelligence (AI) employing machine learning algorithms and neural network models can be used in a variety of image and video processing tasks. For instance, in video processing and analytics applications using AI, each frame of a video is fed to an AI system. The AI system typically repeats a similar set of computations on each frame of the video, and outputs associated analytics. Unfortunately, such typical processing is computationally intensive. Such high compute requirement is a challenge in many devices, especially devices that have limits on power consumption.

BRIEF DESCRIPTION OF THE DRAWINGS

FIG. 1A illustrates a video analytics system in which video frames are opportunistically processed by either a first computation engine or by a second computation engine to reduce overall computational burden, without substantially sacrificing quality of the video analytics, wherein the first and second computation engines have direct access to the video frames prior to encoding of the video frames, in accordance with an embodiment of the present disclosure.

Figure 1B:
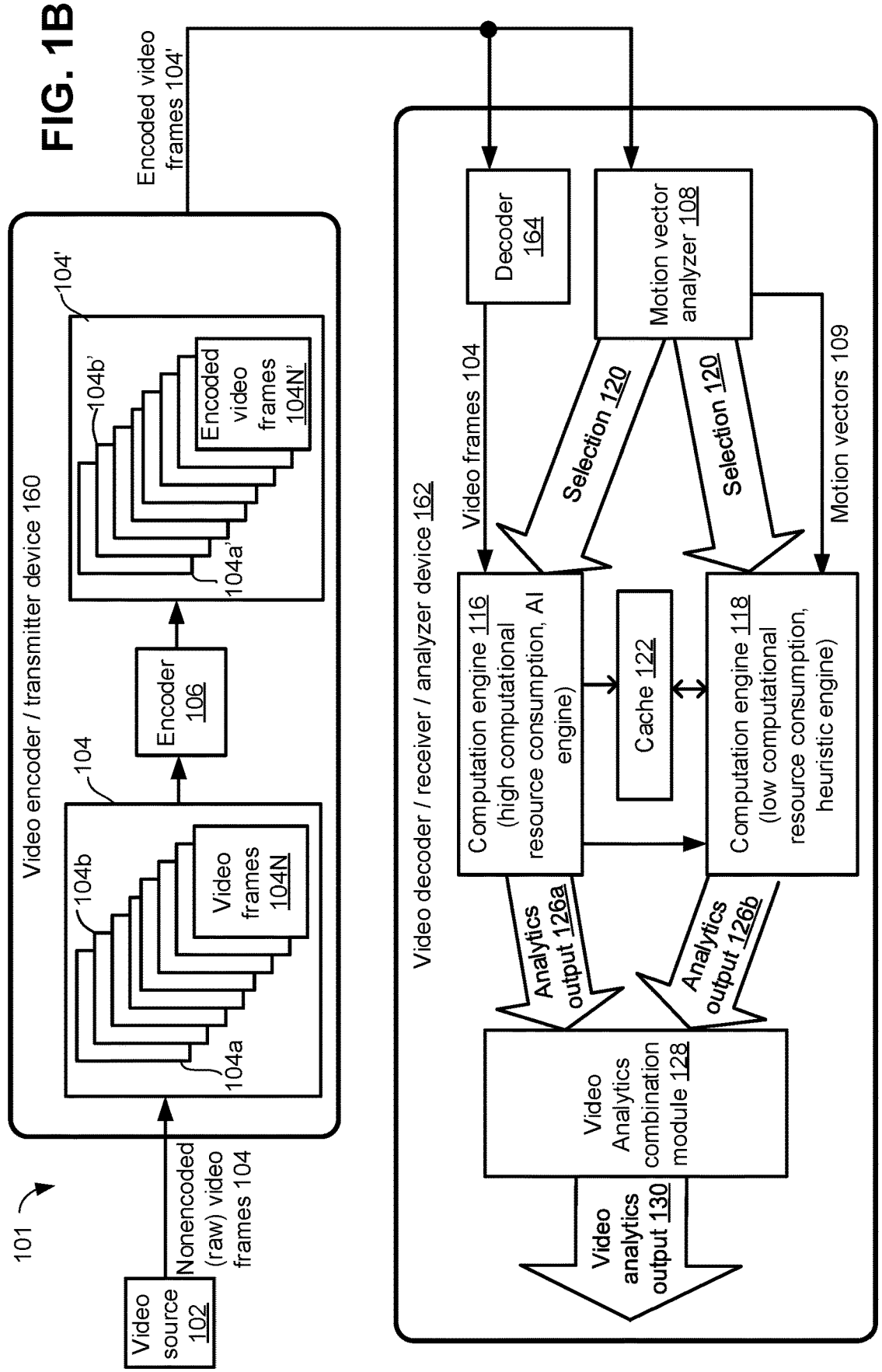
FIG. 1B illustrates a video analytics system in which video frames are opportunistically processed by either a first computation engine or by a second computation engine to reduce overall computational burden, without substantially sacrificing quality of the video analytics, wherein the first and second computation engines do not have direct access to the video frames prior to encoding of the video frames, in accordance with another embodiment of the present disclosure.

Although the following Detailed Description will proceed with reference being made to illustrative embodiments, many alternatives, modifications, and variations thereof will be apparent in light of this disclosure.

DETAILED DESCRIPTION

A video analytics system is provided in which video frames are opportunistically processed by either a first computation engine or a second computation engine, to reduce overall computational burden on the video analytics system, without sacrificing quality of video analytics provided by the video analytics system. In particular, the first computation engine is configured to process video frames that are more computationally burdensome, and the second computation engine is configured to process frames that are less computationally burdensome. For example, in some such example embodiments, the first computation engine employs trained machine learning and/or neural network modules, and/or various computationally-intensive computer vision algorithms to generate accurate analytics data. As will be appreciated, these artificial intelligence (AI) and computer vision based analytics tend to incur a relatively high computational burden on the processor(s) of the video analytics system. The second computation engine is less computationally intensive compared to the first computation engine. For example, in some such embodiments, the second computation engine executes a heuristics-based algorithm or any other computer vision algorithm that requires less computational intensity than the first computation engine to process a video frame. An analyzer of the video analytics system classifies individual frames of a video, or portions of frames of the video, as being either critical or non-critical. Critical frames or critical portions of frames include non-redundant or significant information and thus tend to benefit from relatively high computational intensity, whereas non-critical frames or non-critical portions of frames include redundant or non-significant information and thus tend to benefit from relatively lower computational intensity.

In some embodiments, the first computation engine processes critical frames or critical portions of frames and generates corresponding analytics output, whereas the second computation engine processes non-critical frames or non-critical portions of frames and generates corresponding the analytics output. In some embodiments, a video analytics combination module receives analytics outputs from the first and second computation engines, and combines the analytics output from the two computation engines to generate final video analytics output. Thus, the video analytics combination module is programmed or otherwise configured to collate the analytics outputs from the respective computation engines, to create a continuous video analytics workflow, and which provides collated analytics in the final video analytics output. For instance, in one such embodiment, the final video analytics output switches between the computationally expensive analytics output from an AI-based first computation engine and the relatively less expensive analytics output from the heuristic-based second computation engine, to deliver optimal analytics results at a much lower overall computational burden for the video analytics system.

Furthermore, because frames or portions of frames with non-redundant or significant information are processed by the first computation engine and thus afforded a relatively high degree of computational intensity, the decrease in the overall computational load of the video analytics system does not adversely impact quality of the video analytics. Numerous variations and embodiments will be appreciated in light of this disclosure.

General Overview

As previously noted, in an AI based analytics system for processing frames of a video, the AI system typically repeats a similar set of computations on each frame of the video, and outputs desired analytics. That is, each frame is fed to the AI system that outputs associated analytics for that particular frame. This typically results in relatively high computational demands for the analytics system. One possible technique that can be used to solve such issues involves downsizing (e.g., reducing resolution) individual frames prior to processing, although such a technique can adversely impact quality of the video analytics, because useful information is lost in the downsizing process. Another possible technique to solve such issues involves lowering the frame rate in the input of the AI system. However, as the frame rate is reduced, this also can adversely impact the quality of the video analytics, again due to loss of useful information during the process. For completeness of discussion, there also exist systems that track objects using motion vectors as well as apply semantic segmentation utilizing motion vector information. However, note that such solutions do not analyze motion vectors to determine the nature of computational intensity in video based AI analytic systems, as variously described herein.

Thus, the video analytics techniques provided herein can be used to reduce the computational burden of the overall analytics system, without substantially sacrificing quality of the analytics process. For example, in some embodiments, the video analytics system comprises a first computation engine employing various AI and computer vision analytics techniques that are relatively computationally intensive to provide a robust set of analytics for frames processed by that first computation engine. In some such embodiments, the first computation engine comprises a trained machine learning module and/or a neural network module, and further employs one or more computer vision algorithms to generate accurate analytics data. A second computation engine is separate from and less computationally intensive than the first computation engine. For example, the second computation engine executes a heuristics-based algorithm or other computer vision algorithm that requires less computation than the first computation engine to process a video frame. Thus, in an example, the first computation engine provides analytics data with relatively high accuracy and with relatively high computational demand, while the second computation engine provides analytics data with relatively low computational demand. The resulting analytics data set is thus quite robust.

As will be discussed herein in detail in turn, video frames or portions of video frames including critical or non-redundant information are processed by the first computation engine, while video frames or portions of video frames including non-critical or redundant information are processed by the second computation engine. Thus, the first computation engine processes only a subset of all frames in the video signal, instead of processing each frame in the video signal, and the remaining subset of video frames are processed by the second computation engine. In some embodiments, an analyzer within the video analytics system identifies one or more frames or portions of frames to be critical (e.g., comprising significant or non-redundant information), and identifies one or more other frames or slices of frames to be non-critical (e.g., comprising non-significant or redundant information). Thus, the analyzer selects frames or portions of frames of the video to be processed either by the first computation engine or the second computation engine.

For example, the analyzer receives a sequence of video frames. The analyzer identifies, within the sequence of video frames, one or more frames that include non-redundant or significant data. These frames are referred to herein as critical frames, simply to facilitate ease of description. In an example, instead of classifying an entire frame as a critical frame, the analyzer can also classify merely a section of a frame to include non-redundant or significant data, and such a section of the frame including non-redundant or significant data is also referred to herein as critical portion or slice of a frame. A portion of a video frame may be referred to herein as a slice of that video frame, in cases where that portion of the frame is encoded separately from any other region in that frame. Note, however, that a portion is not necessarily encoded separately in all cases, and thus not all portions are slices. In this manner, the term portion may be broader than the term slice. In any such cases, the analyzer is programmed or otherwise configured to pass critical frames or frame portions to the first computation engine for analytics processing, according to some such embodiments.

On the other hand, frames that do not include any non-redundant or significant data are classified as non-critical frames by the analyzer. Similarly, if a first portion or slice of a frame is classified as a critical portion slice, and if a second portion or slice of the frame is identified to include merely redundant or non-significant data, then the analyzer classifies the second portion or slice of the frame as a non-critical portion or slice of the frame. Thus, individual frames can be critical frames or non-critical frames. Similarly, a frame can have one or more critical portions or slices and one or more non-critical portions or slices. As discussed, critical frames and critical portion or slices are processed by the first computation engine, and non-critical frames and non-critical portions or slices are processed by the second computation engine.

In some embodiments, the analyzer is an artificial intelligence (AI) system, such as machine learning module or a neural network module, which is trained to classify frames or slices of frames as being critical or non-critical. In some other embodiments, the analyzer uses heuristic or predefined rules to classify frames or slices of frames as being critical or non-critical. Thus, the analyzer is trained, programmed or otherwise configured to differentiate between frames or portions/slices of frames that need to be processed by the first computation engine, and frames or portions/slices of frames that can be processed by the second computation engine.

Determination of whether a frame, or a portion or slice of the frame, is critical can be based on one or more criteria indicated in the given frame, such as motion vectors of that frame. In more detail, video frames, after being encoded or compressed, are typically classified as I-frame, P-frame, or B-frame. For example, compression algorithms used for video encoding generally operate by defining a video stream in terms of a sequence of independent frames (I-frames), intervening predicted frames (P-frames), and bidirectional predicted frames (B-frames). I-frames are the least compressible, but don't require other video frames to decode (an I-frame can be decoded independently of other frames). P-frames can use data from previous frames to decompress, and are more compressible than I-frames. B-frames can use both previous and subsequent frames for data reference, to achieve the highest amount of data compression. P-frames can be understood as storing only differences as compared to an immediately preceding frame. B-frames can be understood as storing only differences as compared to both immediately preceding and immediately succeeding frames. These differences can be characterized in terms of motion vectors. A motion vector represents a direction and distance that a particular area of an image moves between two adjacent video frames. A motion vector has two components: a direction, and an intensity. The direction of a motion vector indicates the direction that the corresponding area of the image moves between two adjacent video frames. The intensity of a motion vector (also referred to as amplitude or magnitude of the motion vector) indicates a distance that the corresponding area of the image moves between two adjacent video frames. If the intensity is relatively higher, then the corresponding area of the image moves by a relatively higher distance between the two adjacent video frames. For a plurality of motion vectors, the intensity can be an average intensity of all the motion vectors, or a maximum intensity among all the motion vectors, or some other statistically appropriate representation (e.g., a median intensity of all the motion vectors, or an average intensity after excluding the highest and the lowest intensities). Motion vectors can be extracted from an encoded video stream, without having to decode the encoded video stream. Thus, motion vectors of a given frame can be used to determine whether that frame, or a portion or slice of that frame, is critical or non-critical. This determination of critical or non-critical can then be used to select the processing path for that frame or portion of a frame. Note that a given frame can have one or more portions designated as critical and one or more portions designated as non-critical, as will be appreciated in light of this disclosure.

In any case, the analyzer receives an encoded stream of video frames. In some embodiments, if a specific frame is an I-frame, then the analyzer selects the entire frame (or at least a part of the frame) to be processed by the first computation engine. Thus, I-frames are identified as being critical frames comprising non-redundant information. For example, an I-frame can have objects that are not present in the immediate previous frame, as an I-frame has no indication of objects present therein with respect to the immediate previous frame. Thus, the first computation engine processes I-frames, to apply an appropriate video analytics task (such as object detection, gesture detection, facial expression detection, or another type of video analytics task that can be specifically tailored to a given application).

For P-frames, the analyzer determines which processing path is to be used. For example, in some embodiments, for a video frame encoded as a P-frame, the analyzer analyzes the number of non-zero intensity motion vectors, as well as the intensity of such motion vectors, to determine whether the frame (or a portion or slice of the frame) is to be processed by the first or second computation engine. For example, if the number of motion vectors associated with a frame exceeds a number threshold value, the frame (or a portion or slice of the frame) is deemed critical and is selected to be processed by the first computation engine. In another example, if the intensity of motion vectors associated with a frame exceeds an intensity threshold value, the frame (or a portion or slice of the frame) is identified as being critical and is selected to be processed by the first computation engine. On the other hand, if the number of motion vectors associated with a frame or frame portion is less than the number threshold value and/or if the intensity of motion vectors associated with the frame or frame portion is less than the intensity threshold value, the frame (or a portion or slice of the frame) is identified as being non-critical and is selected to be processed by the second computation engine.

In some embodiments, the video analytics system further comprises a video analytics combination module, which receives analytics output from the first computation engine and analytics output from the second computation engine. The video analytics combination module adds up or otherwise combines the analytics output from the two computation engines, to generate a final or overall video analytics output. Thus, the video analytics combination module effectively collates the analytics outputs from the respective computation engines, to create a continuous video analytics workflow, and provides the final video analytics output. In some cases, the final video analytics output switches between the robust analytics output from the AI-based first computation engine and the robust analytics output from the heuristic second computation engine, to deliver analytics results at a much lower computational burden for the overall video analytics system.

Thus, as discussed, video frames or portions of video frames including critical or non-redundant information are processed by the first computation engine, while video frames or slices of video frames including non-critical or redundant information are processed by the second computation engine. In this manner, the first computation engine processes only a subset of all frames in the video signal, instead of having to process each frame in the video signal, and the remaining subset of video frames are processed by the second computation engine using relatively lower computational intensity operations. Accordingly, computational load on the highly computationally intensive first computation engine is decreased significantly. Thus, due to the shared processing of the frames between the two computation engines, the overall computational load of the video analytics system decreases significantly.

Furthermore, the decrease in the overall computational load of the video analytics system does not come at a cost of material reduction in analytics quality, according to some embodiments. For example, critical frames or critical portions of frames with non-redundant or significant information are processed by the first computation engine, whereas the second computation engine only processes non-critical frames or non-critical portions of frames with redundant and non-significant information. Thus, the decrease in the overall computational load of the video analytics system does not adversely impact quality of the video analytics. Numerous variations and embodiments will be appreciated in light of this disclosure.

System Architecture

FIG. 1A illustrates a video analytics system 100 in which video frames are opportunistically processed by either a first computation engine 116 or by a second computation engine 118 to reduce computational burden on the video analytics system 100, without substantially sacrificing quality of the video analytics, where the first and second computation engines 116, 118 have access to the video frames prior to encoding of the video frames, in accordance with an embodiment of the present disclosure.

In some embodiments, the system 100 performs one or more types of analytics on video frames. Any appropriate type of analytics and processing of the video frames can be performed, and this disclosure is not limited by any specific type of analytics operation of the video frames. Examples of analytics operation include object detection (e.g., identifying an object within the video), object tracking, object tracking and identification, analysis of behavior of an object within the video (such as analysis of behavior of one or more customers within the video), user gesture recognition, and/or any other appropriate image and video analysis operations.

In some embodiments, the system 100 comprises an appropriate video source 102, such as an imaging device, a camera, a video camera, a surveillance camera, a storage comprising raw video frames, and/or the like. Although the video source 102 is illustrated to be included in the system 100, in some embodiments, the video source 102 can be external to the system 100. In some other embodiments, various components of the system 100, including the video source 102, are integrated in a single device. For example, in some such embodiments, such a device can both capture video and perform analytics on the captured video.

In some embodiments, video frames 104 are received from the video source 102. In some such embodiments, the video frames 104 are raw or unencoded (e.g., uncompressed)

video frames. Merely as an example, video frames 104a, ..., 104N are symbolically illustrated in FIG. 1A. In an example, individual ones of the video frames 104 is in Red-Green-Blue (RGB) format.

In some embodiments, the system 100 comprises an encoder 106 to encode or compress the video frames 104, to generate encoded video frames 104'. For example, video frame 104a is encoded to generate video frame 104a', video frame 104b is encoded to generate video frame 104b', and so on.

Compression algorithms used for video encoding generally operate by defining a video stream in terms of a sequence of independent frames (I-frames), intervening predicted frames (P-frames), and bidirectional predicted frames (B-frame). I-frames are the least compressible, but don't require other video frames to decode. P-frames can use data from previous frames to decompress, and are more compressible than I-frames. B-frames can use both previous and subsequent frames for data reference, to achieve the highest amount of data compression. An I-frame can be decoded independently of other frames. P-frames can be understood as storing only differences as compared to an immediately preceding frame. B-frames can be understood as storing only differences as compared to both immediately preceding and immediately succeeding frames. These differences can be characterized in terms of motion vectors. A motion vector represents a direction and distance that a particular area of an image moves between two adjacent video frames.

Thus, a motion vector has two components: a direction, and an intensity. The direction of a motion vector indicates the direction that the corresponding area of the image moves between two adjacent video frames. The intensity of a motion vector (also referred to as amplitude of the motion vector) indicates a distance or amplitude that the corresponding area of the image moves between two adjacent video frames. If the intensity is relatively higher, then the corresponding area of the image moves by a relatively higher distance between the two adjacent video frames. For a plurality of motion vectors, the intensity can be an average intensity of all the motion vectors, or a maximum intensity among all the motion vectors.

Advantageously, motion vectors can be extracted from an encoded video stream, without having to decode the encoded video stream. More specifically, such data can be extracted by simply parsing data contained within the encoded stream, and therefore such extraction requires negligible processing capacity as compared to even partial decoding of the video stream.

For example, for a first video frame and a second video frame that are two consecutive frames, assume that contents of the first video frame are known. Assume that an object, which is a size of a pixel, moves from a first location in the first video frame to a second location in the second video frame. A corresponding motion vector associated with the second video frame captures the movement from the first location in the first video frame to the second location in the second video frame. Thus, if the first location of the object in the first video frame and the motion vector are known, then the location of the object in the second video frame would also be known. Note that, merely as an example, the first video frame can be encoded as an I-frame, and the second video frame can be encoded as a P-frame. Thus, the second video frame, when encoded, stores differences between the two video frames. The motion vector can be extracted from the encoded second video frame, which is encoded as a P-frame.

Referring again to FIG. 1A, a motion vector analyzer 108 (also referred to herein as "analyzer 108") receives the encoded video frames 104', and extracts motion vectors from each frame. As previously discussed herein, a motion vector has two components: a direction, and an intensity, and in some embodiments, the analyzer 108 extracts the direction and the intensity of the motion vectors. In subsequent downstream process, the intensity of the motion vectors is used, and so, in some embodiments, the analyzer 108 extracts at least the intensity of the motion vectors, and optionally may also extract the direction of the motion vectors.

Figure 2A:
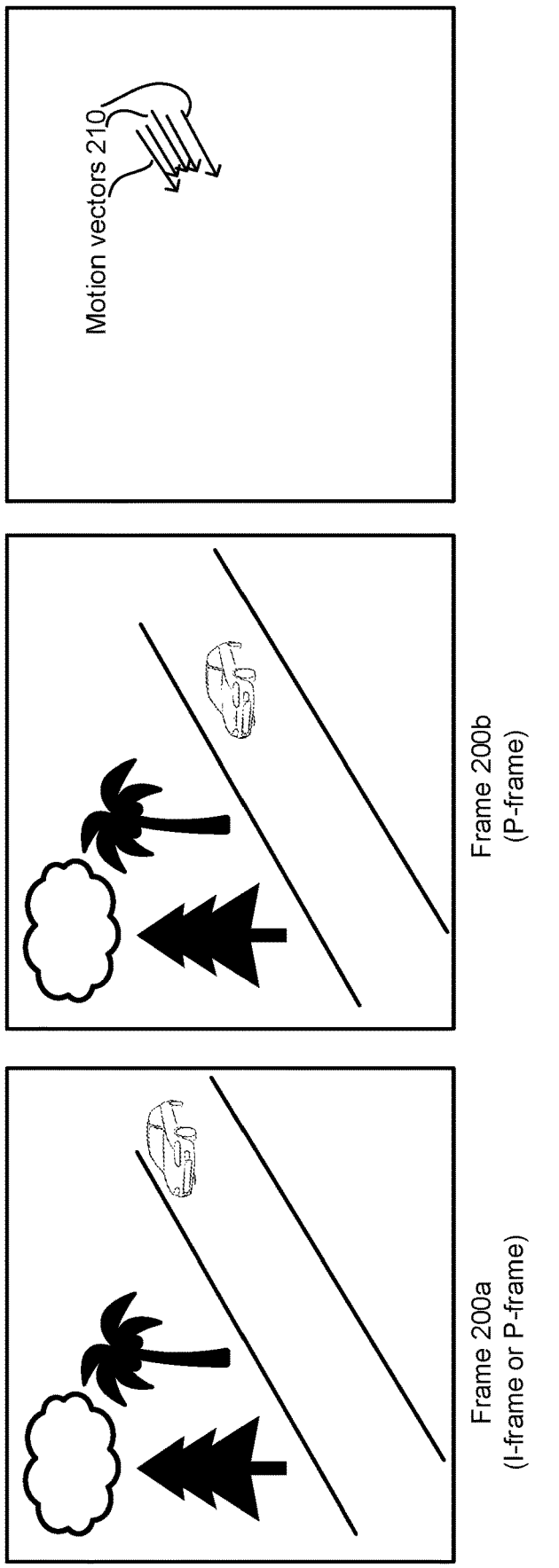
FIGS. 2A, 2B, 2C, 2D, 2E, and 2F each illustrate corresponding first and second consecutive video frames, and corresponding motion vectors associated with the second video frame, where the motion vectors are generated by a motion vector analyzer of the system of FIGS. 1A or 1B, in accordance with an embodiment of the present disclosure.
Figure 2B:
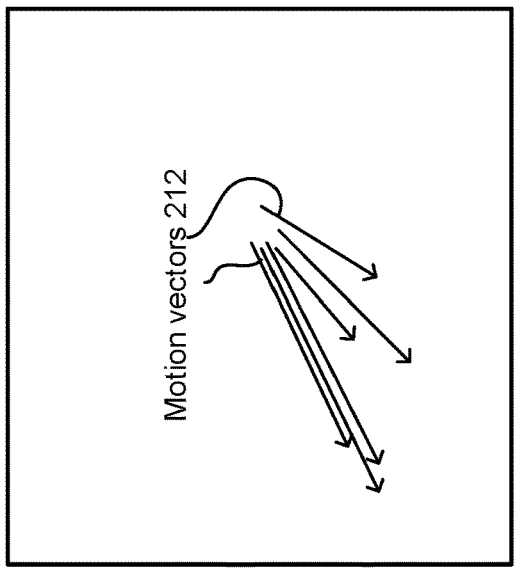
Figure 2B:
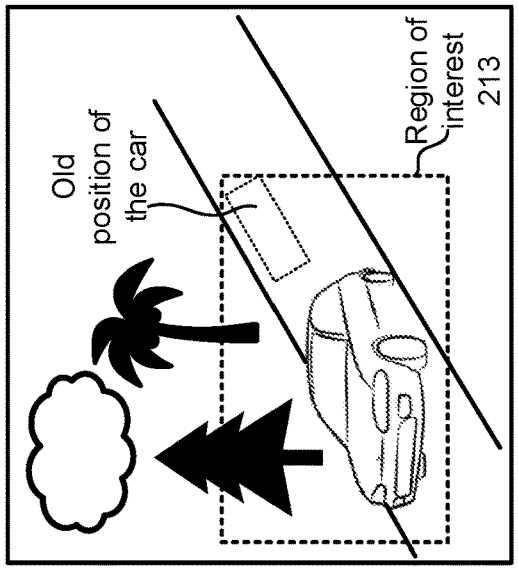
Figure 2B:
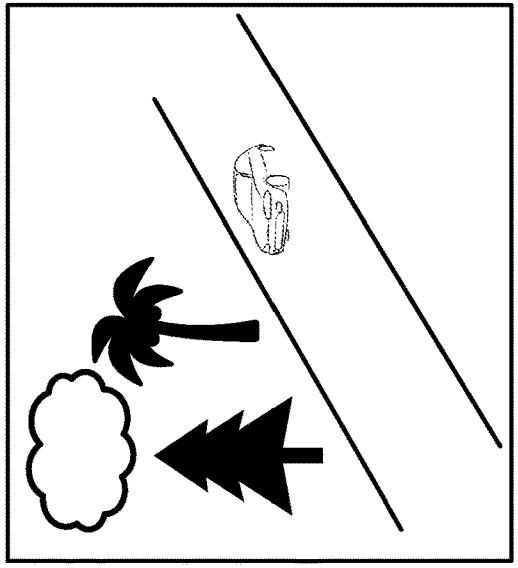
Figure 2B:
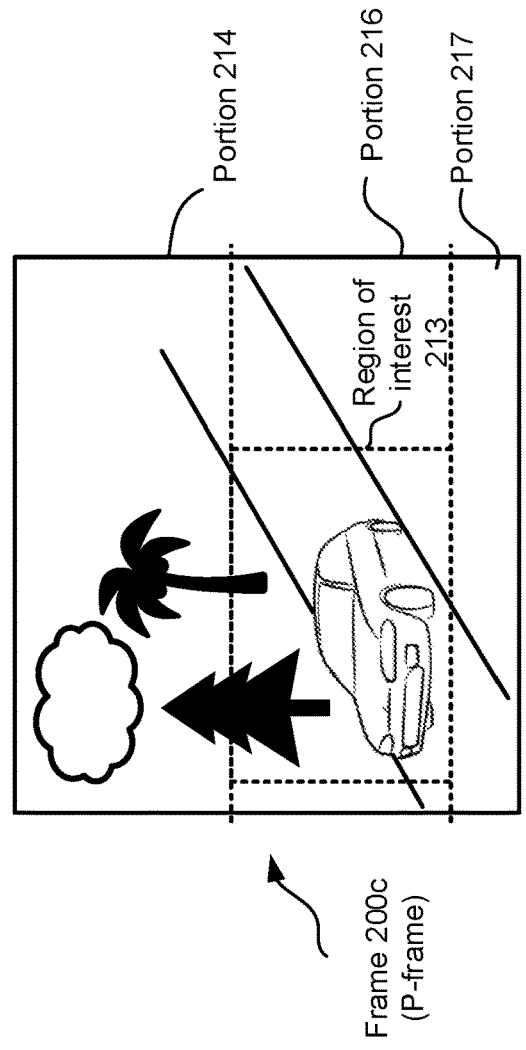
Figure 2C:
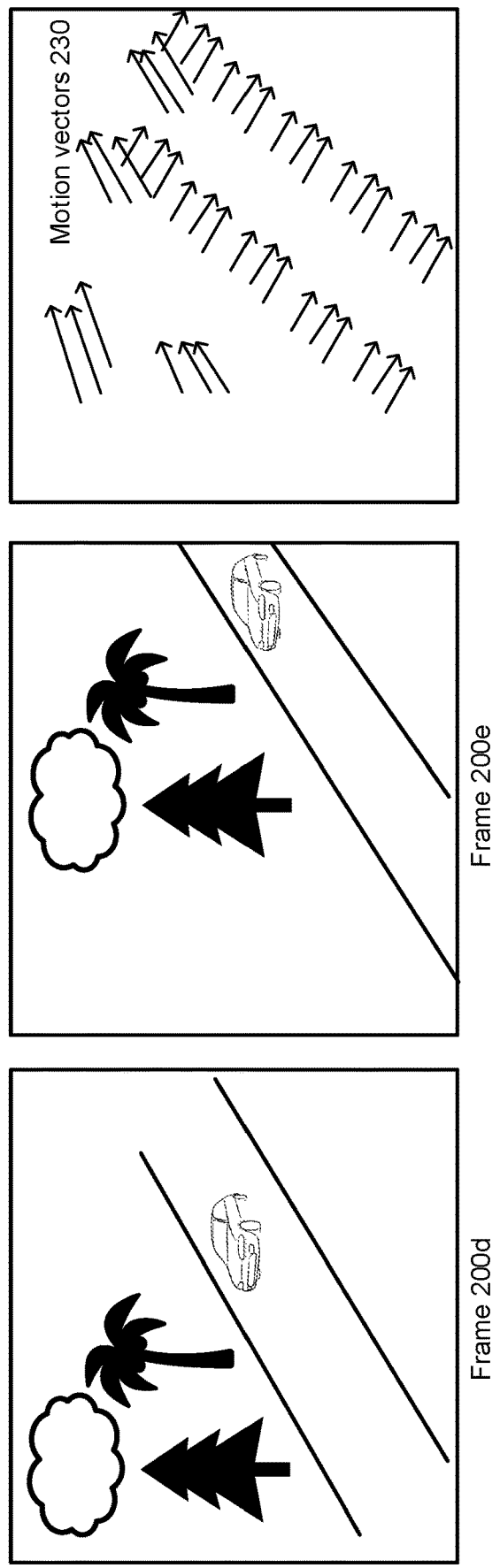

Each of FIGS. 2A, 2B, 2C. 2D, 2E, and 2F illustrate corresponding first and second consecutive video frames, and corresponding motion vectors associated with the second video frame, where the motion vectors are generated by the analyzer 108 of the system 100 of FIG. 1A, in accordance with an embodiment of the present disclosure.

Referring to FIG. 2A, illustrated are two consecutive video frames 200a, 200b received by the analyzer 108. It may be noted that the video frames 200a, 200b may be encoded, and hence, assuming that the video frame 200b is a P-frame, the analyzer 108 receives the encoded frame 200b comprising differences between the frames 200b and 200a (e.g., from which the analyzer 108 can reconstruct the video frame 200b, if necessary).

As seen in FIG. 2A, a position of a car in the video frame 200b is different relative to the position of the car in the video frame 200a. Positions of other static objects, such as cloud and trees, do not change in the two video frames 200a, 200b. Accordingly, the frame 200b can be encoded to represent the difference between the frames 200b and 200a. That is, in an example, frame 200b is a P-frame. The frame 200a can be an I frame or a P-frame, e.g., based on how different the frame 200a is relative to an immediate previous frame, and how the frame 200a is encoded.

In some embodiments, the analyzer 108 extracts motion vectors 210 from the encoded frame 200b, where the motion vectors 210 are indicative of the change in position of the car between the two frames. Note that the motion vectors 210 are merely for purposes of illustration, and are not drawn to scale. Furthermore, there are multiple motion vectors to indicate the movement of the car, and merely some of the motion vectors are illustrated in FIG. 2A. Furthermore, motion vectors having zero intensity (e.g., associated with static objects like the trees and cloud) are not illustrated in FIG. 2A.

Referring now to FIG. 2B, illustrated are two consecutive video frames 200b, 200c received by the analyzer 108. It may be noted that the video frames 200a, 200b may be encoded, as discussed with respect to FIG. 2A. As seen in FIG. 2B, a position of a car in the video frame 200c is different relative to the position of the car in the video frame 200c. Positions of other static objects, such as the cloud and the trees, do not change in the two video frames 200b, 200c.

In some embodiments, the frame 200c may be a P-frame, assuming that the change in the location and/or size of the car between the two frames 200c and 200b is lower than a threshold value, based on the settings on the encoder 106. The frame 200b can be an I-frame or a P-frame, although in the example of FIGS. 2A and 2B, the frame 200b is assumed to be a P-frame.

In some embodiments, the analyzer 108 generates motion vectors 212 indicative of the change in position of the car in the frame 200c relative to the frame 200b. Note that as discussed herein, the motion vectors 212 are merely for purposes of illustration, are not drawn to scale, and only some of the motion vectors are illustrated.

Comparing FIGS. 2A and 2B, in FIG. 2B the change in the position of the car between the two frames 200b, 200c is larger than the change in the position of the car between the two frames 200a, 200b of FIG. 2A. Thus, the motion vectors 212 of FIG. 2B has a higher intensity (or higher length) compared to motion vectors 210 of FIG. 2A.

Referring now to FIG. 2C, illustrated are two consecutive video frames 200d200e received by the analyzer 108. It may be noted that the video frames 200d200e may be encoded, as discussed with respect to FIG. 2A. As seen in FIG. 2C, the video frame 200e is a spatially shifted version of the video frame 200dFor example, a position of an image capturing device may have been shifted while capturing the two frames 200d200eAccordingly, objects in the frame 200e are shifted towards the left, when compared to the frame 200dThe frame 200e can be encoded as a P-frame or an I-frame, e.g., based on a type or configuration of the encoding algorithm used by the encoder 106.

In some embodiments, the analyzer 108 generates motion vectors 230 indicative of the change in position of various objects in the frame 200c relative to the frame 200bNote that as discussed herein, the motion vectors 230 are merely for purposes of illustration, are not drawn to scale, and only some of the motion vectors are illustrated.

Comparing FIGS. 2A and 2C, in FIG. 2A merely the car changed its position, whereas in FIG. 2B multiple objects changed their positions. Accordingly, a number of motion vectors 230 with non-zero intensity in FIG. 2C is larger than a number of motion vectors 210 with non-zero intensity in FIG. 2A.

Figure 2D:
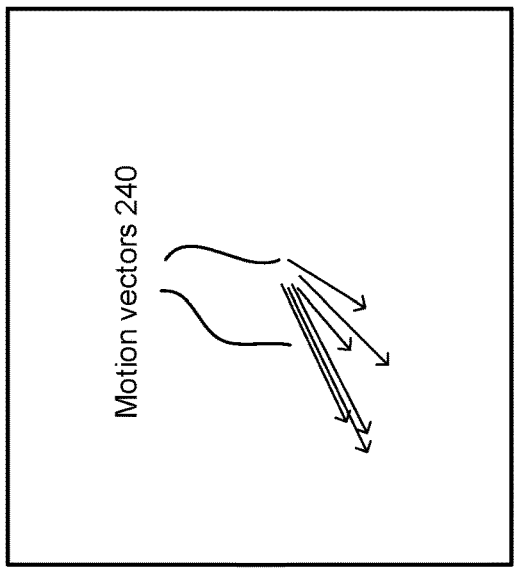
Figure 2D:
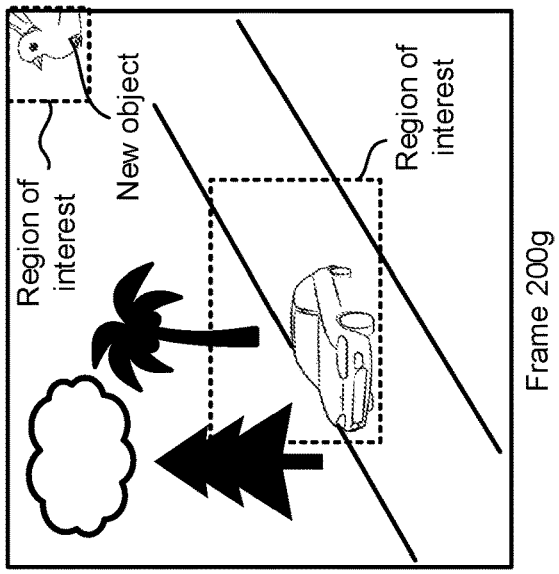
Figure 2D:
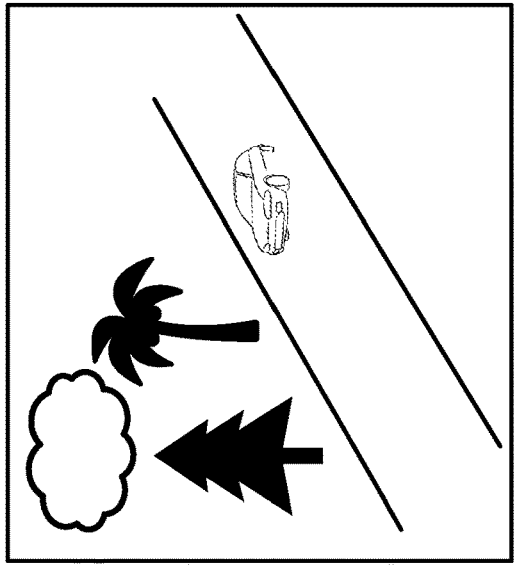
Figure 2D:
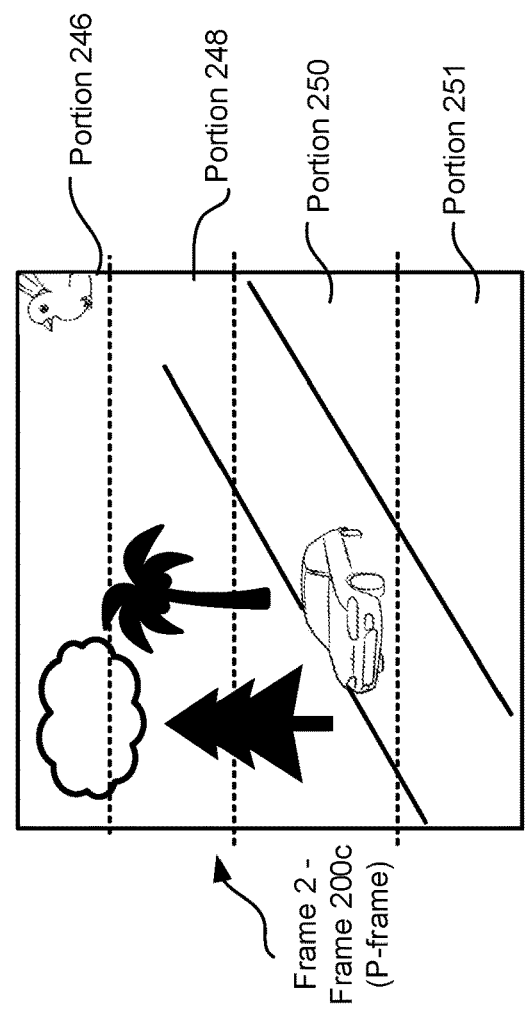

Referring now to FIG. 2D, illustrated are two consecutive video frames 200f200g received by the analyzer 108. It may be noted that the video frames 200f200g may be encoded, as discussed with respect to FIG. 2A. As seen in FIG. 2D, in the video frame 200gthe car has changed position relative to the frame 200fAdditionally, a new object (e.g., a bird) is now present in the frame 200dwhich was absent in the frame 200fThe frame 200g can be encoded as a P-frame or an I-frame, e.g., based on a type or configuration of the encoding algorithm used by the encoder 106.

In some embodiments, the analyzer 108 generates motion vectors 240 indicative of the change in position of the car. No motion vector is generated corresponding to the new object bird, as the immediate previous frame didn't have the bird. Note that as discussed herein, the motion vectors 230 are merely for purposes of illustration, are not drawn to scale, and only some of the motion vectors are illustrated.

Figure 2E:
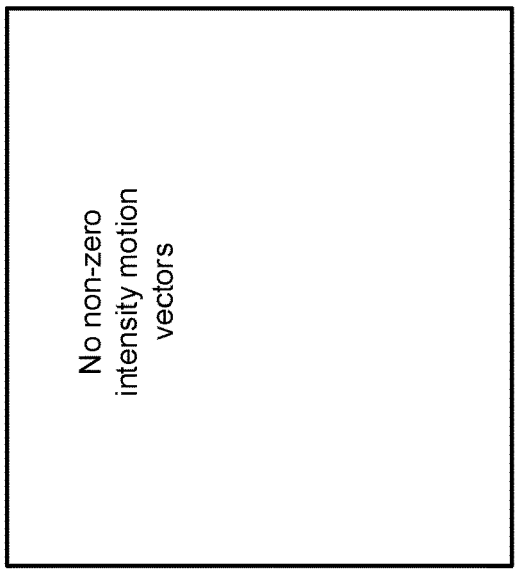
Figure 2E:
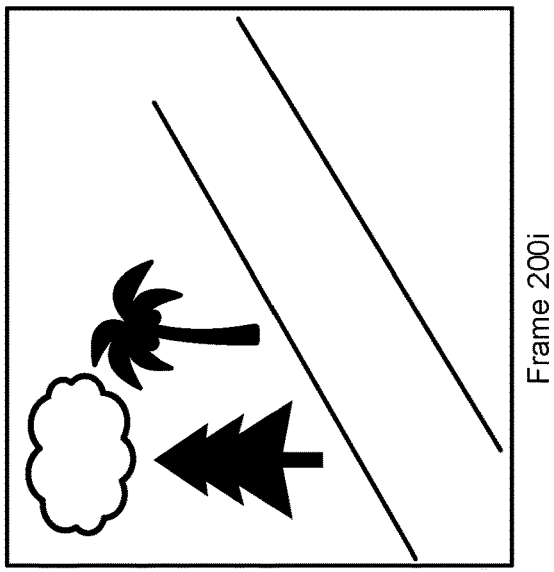
Figure 2E:
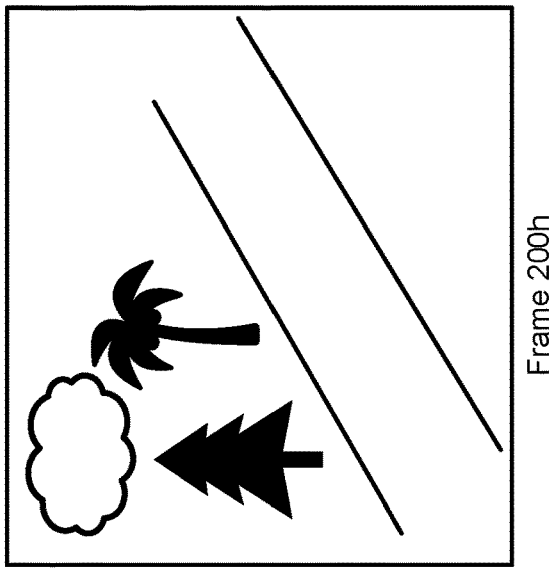

Referring now to FIG. 2E, illustrated are two consecutive video frames 200h200i received by the analyzer 108. It may be noted that the video frames 200h200i may be encoded, as discussed with respect to FIG. 2A. As seen in FIG. 2E, the two video frames 200h200i have substantially similar scene, and hence, no motion vectors are generated for the frame 200i.

Figure 2F:
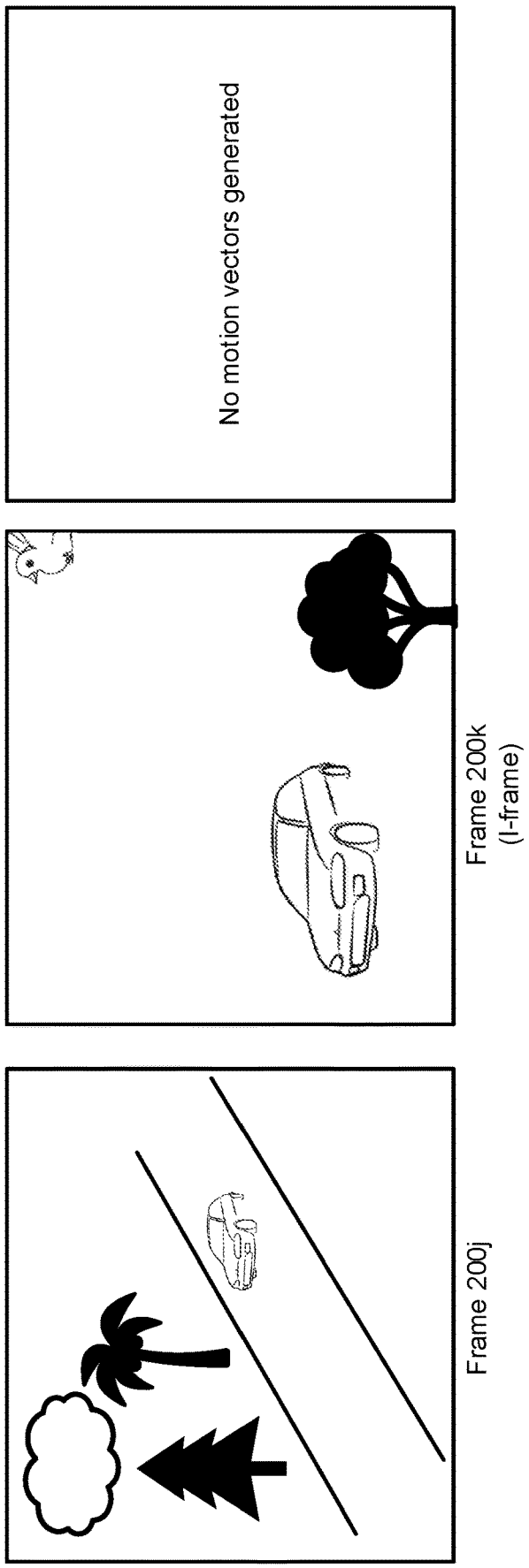

Referring now to FIG. 2F, illustrated are two consecutive video frames 200j200k received by the analyzer 108. It may be noted that the video frames 200j200k may be encoded, as discussed with respect to FIG. 2A. As seen in FIG. 2F, the two video frames 200j200k have different objects, and frame 200k is an I-frame. Hence, no motion vectors are generated for the frame 200k.

Referring again to FIG. 1A, as discussed herein, the analyzer 108 receives the encoded video frames 104' and extracts motion vectors from each frame. The frames 200a200i of FIGS. 2A-2E are examples of the encoded video frames 104' received by the analyzer 108. In some embodiments, the analyzer 108 selects one of the computation engine 116 or to the computation engine 118 for processing at least a section of a video frame, and the section of the video frame is then transmitted to the selected engine for processing, as will be discussed in further detail in turn.

In some embodiments, computational burden imposed by the first computation engine 116 (also referred to herein as engine 116) for processing a video frame is different from computational burden imposed by the second computation engine 118 (also referred to herein as engine 118) for processing the video frame. Merely as an example, the engine 116 imposes higher computational burden than the engine 118. In some embodiments, the engine 116 is an AI based computation engine, while the engine 118 is a non-AI based computation engine such as a heuristic based engine.

Merely as an example, in some embodiments, the AI based computation engine 116 comprises one or more neural network models. In some embodiments, the engine 116 is able to perform relatively complex video and image analysis tasks, such as object detection, computer vision tasks, customer pose and/or facial expression detection tasks, gesture detection tasks, and/or any other appropriate complex video and image analysis tasks. On the other hand, the heuristic based computation engine 118 can perform relatively simple video and image analysis tasks, such as object tracking.

For example, for video analytics tasks, such as object-detection and tracking tasks, object detection can be performed by the AI based engine 116, while the heuristic based engine 118 can be used to track motion of objects. In another example, complex tasks like customer-behavior analysis often require detailed analysis of complex features like pose, relative depth, etc., which can be extracted from motion vectors using neural networks or computer vision algorithms—such tasks can be performed by the engine 116.

In some embodiments, the analyzer 108 extracts motion vectors from the encoded video frames 104', as discussed with respect to FIGS. 2A-2D. Additionally, the analyzer 108 analyzes the extracted frame, to decide whether the frame (or sections of the frame) is to be processed by the engine 116 or the engine 118. In some embodiments, the analyzer 108 can be a heuristic engine or a relatively small neural network, which are trained on motion vector frames to detect frames with non-redundant and critical information. Although in some embodiments the analyzer 108 can analyze original RGB images to make the selection, in the embodiments discussed herein the analyzer 108 relies on extraction and usage of motion vectors to make the selection between the engines 116, 118 for processing a frame (or at least a part of the frame). In an example, use of motion vector frames, instead of original RGB image, for making the selection in the analyzer 108 reduces the size of inputs used, e.g., by up to three times (3×).

In some embodiments, the analyzer 108 is an artificial intelligent system, such as a neural network module, which can be trained on motion-vectors to make the above discussed selection, while in some other embodiments the analyzer 108 uses heuristic or pre-defined rules to make the above discussed selection. In some embodiments, the analyzer 108 is configured or trained to differentiate between frames that need to be processed by the AI based computation engine 116 and frames that can be processed by the heuristic based computation engine 118.

For example, the analyzer 108 identifies if a frame carries any significant and/or non-redundant information. Such identification can take into account and exclude changes due to motion of objects in the previous frames. A frames (or at least a section of a frame) having significant and/or non-redundant information is assigned to the AI based computation engine 116 for processing, whereas a non-significant frame (or at least a section of such a frame) having merely redundant information is assigned to the heuristic based computation engine 118 for processing.

Put differently, sections of a frame (or an entire frame) having significant and/or non-redundant information are selected by the analyzer 108 to be processed by the AI based computation engine 116. On the other hand, sections of a frame (or an entire frame) having non-significant and/or redundant information are selected by the analyzer 108 to be processed by the heuristic based computation engine 118.

Whether a frame has significant and/or non-redundant information (or has non-significant and/or redundant information) is determined by the analyzer 108. In some embodiments, if a specific frame is an I-frame, then the analyzer selects the entire frame (or at least a part of the frame) to be processed by the engine 116. For example, the I-frame can have objects that may not be present in the immediate previous frame, as an I-frame has no indication of objects present therein with respect to the immediate previous frame. Thus, the AI based computation engine 116 processes the I-frame, to apply an appropriate video analytics task (such as object detection, gesture detection, customer facial expression detection, or another type of video analytics task that can be implementation specific). Likewise, in some embodiments, if a frame comprises a new object that was not present in the immediate previous frame, the entire frame comprising the new object (or at least a section of the frame comprising the new object) is selected to be processed by the AI based computation engine 116.

In some embodiments, for a video frame encoded as a P-frame, the analyzer 108 analyzes the number of non-zero intensity motion vectors, as well as the intensity of such motion vectors, to determine whether the frame (or at least a section of the frame) is to be processed by the engine 116 or 118. For example, if the number of motion vectors associated with a frame exceeds a number threshold value, the frame (or at least a section of the frame) is selected to be processed by the AI based computation engine 116. In another example, if the intensity of motion vectors associated with a frame exceeds an intensity threshold value, the frame (or at least a section of the frame) is selected to be processed by the AI based computation engine 116. In some embodiments, if the number of motion vectors associated with a frame is less than the number threshold value and/or if the intensity of motion vectors associated with the frame is less than the intensity threshold value, the frame (or at least a section of the frame) is selected to be processed by the heuristic based computation engine 118. The intensity of the motion vectors can be an average intensity of all the non-zero motion vectors, or can be a maximum of the intensity of all the non-zero motion vectors. For a given frame, the number of motion vectors and/or the intensity of the motion vectors exceeding corresponding threshold values indicate that one or more objects in the frame has relatively large change in position, relative to the immediate previous frame, thereby warranting processing of the frame by the AI based engine 116.

For example, referring to FIG. 2A, there are relatively lower number of motion vectors 210 associated with the frame 200b (e.g., compared to the number threshold value), and the motion vectors 210 have relatively low intensity (e.g., compared to the intensity threshold value). As discussed, the intensity of the motion vectors 210 can be an average intensity of all the non-zero motion vectors or can be a maximum of the intensities of the motion vectors. Furthermore, no new object is present in the frame 200b with respect to the immediate previous frame 200a. Also, the frame 200b is not an I-frame. Thus, the analyzer determines that there is no significant or non-redundant information present in the frame 200b. Hence, the frame 200b need not be processed by the computationally intensive AI based engine 116. Accordingly, in an example, the analyzer 108 selects the entire frame 200b of FIG. 2A to be processed by the heuristic based computation engine 118.

In another example, referring now to FIG. 2B, there are relatively higher intensity motion vectors 212 associated with the frame 200c, compared to the intensity threshold value. As discussed, the intensity of the motion vectors 210 can be an average intensity of all the non-zero motion vectors or can be a maximum of the intensities of the motion vectors. That is, the car has moved significantly between the two frames 200b and 200c. Such significant movement of the car can, for example, change an object identification task associated with the car. For example, in the frame 200b a number plate of the car may not be visible, whereas in the frame 200c the number plate of the car may be visible and recognizable by the AI based engine 116. That is, there may be significant or non-redundant information present in the frame 200c, due to the relatively large movement of the car represented by the relatively large intensity motion vectors. Hence, in some embodiments, based on the intensity of the motion vectors 212 being larger than the intensity threshold value, the entire frame 200c is selected by the analyzer 108 to be processed by the AI based computation engine 116.

Note that the car is restricted to only a region of interest 213 in the frame 200c. In an example, the region of interest 213 includes sections of the frame 200c having relatively high number of motion vectors (e.g., higher than the number threshold value) and/or relatively high intensity of motion vectors (e.g., higher than the intensity threshold value). In some embodiments, the high number of motion vectors and/or relatively high intensity of motion vectors indicates a change in a shape of an object (such as the car getting bigger in the frame 200c), which may result in the corresponding region to be included in a region of interest. In an example, the region of the frame 200c where the car was previously located may also be included in the region of interest 213, as illustrated in FIG. 2B. For example, as the car has moved from the old to the new position, an object which was previously blocked by the car in the frame 200b may now be visible in the frame 200c. Accordingly, the region of the frame 200c where the car was previously located may also be of interest to the AI engine 116. That is, an occlusion or blocking of a region of a frame, which is removed in a subsequent frame (such as frame 200c), can also be of interest to the AI engine 116, and hence, such as region can be included in the region of interest.

In some embodiments, the AI based computation engine 116 may only be interested in the region of interest 213 in the frame 200c, and not in the entire frame 200c. Accordingly, in some embodiments, the frame 200c is sliced in two or more portions or slices, such as slices 214, 216, and 217 illustrated in FIG. 2B. In general, a portion can be an spatial region of a given frame, while a slice can be any uniquely encoded section of a frame. Although slice is used in various examples herein, that slice can be a portion as well, as will be appreciated. The engine 116 processes one or more slices that has significant or non-redundant information. For example, the slice 216 includes the region of interest 213, and hence, has significant or non-redundant information. Thus, the slice 216 is selected by the analyzer 108 to be processed by the engine 116. On the other hand, the slices 214, 217 includes nonsignificant or redundant information, as no non-zero motion vectors are present in the slices 214, 217—i.e., these slices are same compared to the immediate previous frame 200*b*. Accordingly, the slices 214, 217 are selected by the analyzer 108 to be processed by the engine 118.

Referring now to the example of FIG. 2C, there are relatively higher number motion vectors 230 associated with the frame 200*e*, compared to the number threshold value. This signifies movement of relatively larger number of objects in frame 200*e* with respect to frame 200*d*. This indicates significant or non-redundant change in the frame 200*e* with respect to the frame 200*d*. Accordingly, in some embodiments, the entire frame 200*e* is selected by the analyzer 108 to be processed by the AI based computation engine 116.

Referring now to the example of FIG. 2D, the car in the frame 200*g* has changed position relative to the frame 200*f*. Additionally, a new object (e.g., a bird) is now present in the frame 200*g*, which was absent in the frame 200*f* Because one or more new objects are present in the frame 200*g*, in some embodiments, the entire frame 200*g* is selected by the analyzer 108 to be processed by the engine 116.

However, in some other embodiments, a slice 246 of the frame 200*g* including a region of interest (e.g., comprising the new object) is selected by the analyzer 108 to be processed by the engine 116. In some such embodiments, another slice 250 comprising another region of interest (e.g., comprising the motion vectors associated with the car) can either be selected to be processed by the engine 116 or by the engine 118, e.g., depending on whether the motion vectors 240 exceed the previously discussed number threshold and/or intensity threshold, as discussed with respect to FIGS. 2A-2C. Yet other slices 248 and 251, which does not include either the motion vectors 240 or the new object, can be selected to be processed by the engine 118.

Referring now to the example of FIG. 2E, the frames 200*h* and 200*i* have the same image, and no motion vectors with non-zero intensity is generated for the frame 200*i*. Accordingly, the frame 200*i* does not include any significant or non-redundant information with respect to the frame 200*h*. Hence, the frame 200*i* is selected to be processed by the engine 118.

Referring now to FIG. 2F, as the second frame 200*k* is an I-frame, no motion vectors are generated for the frame 200*k*. The frame 200*k* includes significant or non-redundant information with respect to the frame 200*j*. Hence, the frame 200*k* is selected to be processed by the engine 116.

Referring again to FIG. 1A, the analyzer 108 processes the stream of encoded video frames 104', to extract the motion vectors for individual frames. In some embodiments, based on the detected motion vectors and various other criteria discussed herein (such as whether I-frame, whether new object is detected), the analyzer 108 generates, for each frame, a selection signal 120 and/or a selection signal 122. For example, if a frame is to be processed by the engine 116, the analyzer 108 generates and transmits the selection signal 120 to the engine 116, to indicate that the frame is to be processed by the engine 116. On the other hand, if a frame is to be processed by the engine 118, the analyzer 108 generates and transmits the selection signal 122 to the engine 118, to indicate that the frame is to be processed by the engine 118. If a slice of the frame is to be processed by the engine 116 and another slice of the frame is to be processed by the engine 118 (e.g., as discussed with respect to FIGS. 2B and 2D), then the analyzer 108 generates and transmits both the selection signals 120, 122 to respectively computation engines 116, 118.

In the example of FIG. 1A, the engine 116 has access to the raw or nonencoded frames 104, as the encoder 106 and the engine 116 are included in the same system 100. Accordingly, the engine 116 accesses one or more frames from the sequence raw frames 104. For example, if the selection signal 120 indicates that the engine 116 is to process the full frame 104*a*, not to process the frame 104*b*, and to process a slice of the frame 104*c*, then the engine accesses the nonencoded or RGB version of frames 104*a*, 104*c*, as illustrated in FIG. 1A.

Thus, as discussed, in an example, if the selection signal 120 indicates that the engine 116 is to process the full frame 104*a*, not to process the frame 104*b*, and to process a slice of the frame 104*c*, then the engine accesses and processes the nonencoded or RGB version of the full frame 104*a* and only the selected slice of the frame 104*c*. The engine 116 does not receive or process the frame 102*b*. The engine 116 also does not process the non-selected slices of the frame 102*c* (although the engine 116 may receive the full frame 102*c*). Thus, only critical frames or critical slices of frames (e.g., frames or slices of frames comprising significant and non-redundant information, as discussed with respect to FIGS. 2A-2E) are processed by the engine 116. For example, the engine 116 (e.g., comprising trained neural networks, computer vision algorithms, and/or other machine learning algorithms) process only a subset of all frames in the video signal, instead of processing each frame in the video signal. For example, only region of interest in a given frame can be processed (as discussed with respect to FIGS. 2B and 2D), or only critical frames comprising non-redundant information can be processed (as discussed with respect to FIG. 2C). In some embodiments, the result from regional processing (e.g., processing only the region of interest) can be annotated back to relevant pixels in full frame by the engine 116.

As discusses, processing a frame or a slice of a frame by the engine 116 includes performing image and/or video analytics on the frames or the slices of the frames. Because the engine 116 does not receive and process all the frames in the video, and receives and/or processes merely a subset of the frames of the video, computational load on the highly computationally intensive engine 116 is decreased significantly. The processing of the remaining frames by the low computationally intensive engine 118 comprises relatively low computational intensity operations. Thus, due to the shared processing of the frames between engines 116, 118, the overall computational load of the system 100 decreases significantly.

Furthermore, the decrease in the overall computational load of the system 100 does not come at a cost of any reduction of analytics quality. For example, critical frames or critical slices of frames with non-redundant or significant information are processed by the engine 118, whereas the engine 116 only processes non-critical frames with redundant and non-significant information. Thus, the decrease in the overall computational load of the system 100 does not adversely impact quality of the video analytics.

Thus, only limited set of frames or limited sections of the frames are exposed to full processing by the high compute AI engine 116, whereas remaining non-critical frames are exposed to low compute heuristics engine 118. This eliminates unnecessary full and optimal compute for non-critical frames or sections of frames, while maintaining the full and optimal processing of the critical frames by the engine 116. Thus, the combination of the heuristics-based engine 118 and the more detailed AI based engine 116 enables the system 100 to significantly reduce the overall compute, which is critical for many systems, such as an edge or near edge video analytics solution.

The engine 116 performs analytics on selected frames or selected sections of the frames, which are specifically selected by the analyzer 108 for the engine 116, and generates analytics output 126a. As discussed, any appropriate type of data analytics can be performed by the engine 116, which can be implementation specific. As discussed, examples of analytics operation include object detection (e.g., identifying an object within the video), analysis of behavior of an object within the video (such as analysis of behavior of one or more customers within the video), user gesture recognition, and/or any other appropriate image and video analysis operation. In an example, the engine 116 generates object positions, output classes, class probabilities, and/or other relevant analytics data, based on processing the critical frames (or critical slices of frames). In some embodiments, the analytics output 126a for a given frame can be stored in a cache 122, e.g., to be opportunistically reused by the engine 118 to process one or more subsequent frames, if needed.

In some embodiments, the computation engine 118 also receives the nonencoded frames 104, as illustrated by the dotted line in FIG. 1A. However, receiving of the nonencoded frames 104 by the engine 118 is optional, and hence, this path of flow of frames is illustrated using dotted lines in FIG. 1A.

In some other embodiments, the computation engine 118 does not receive the nonencoded frames 104 (i.e., the dotted path in FIG. 1A is nonexistent in some such embodiments). In some such embodiments, the computation engine 118 receives the motion vectors 109 generated by the analyzer 108. Furthermore, the engine 116 stores, in the cache 122, the frames processed by the engine 116. The engine 118 accesses the frames stored in the cache 122 and the motion vectors 109 from the analyzer 108. Thus, the engine 118 can recreate, or have access to information to recreate one or more frames that are to be processed by the engine 118.

For example, assume a sequence of video signal comprises at least four frames 104a, 104b, 104c, 104d. Also assume that the analyzer 108 determines that the engine 116 is to process (i) entire frame 104a and (ii) a first slice of frame 104c. Assume that the analyzer 108 determines that the engine 118 is to process (i) entire frame 104b, (ii) a second slice of frame 104c, and (iii) entire frame 104d.

In this example, the engine 116 accesses the frame 104a, processes the frame 104a, stores the frame 104a and analytics data of the frame 104a in the cache 122, as well as generates the analytics output 126a for the frame 104a. The engine 118 receives (i) the frame 104a from the cache 122, (ii) analytics data of the frame 104a from the cache 122, and (iii) motion vectors 109 associated with the frame 104b. In some embodiments, based on the frame 104a and the motion vectors 109 associated with the frame 104b, the engine 118 can reconstruct the frame 104b—or at least the engine 118 will have enough information to reconstruct the frame 104b. In some embodiments, based on the (i) the frame 104a from the cache 122, (ii) analytics data of the frame 104a from the cache 122, and (iii) motion vectors 109 associated with the frame 104b, the engine 118 performs analytics on the frame 104b and generates analytics output 126b for the frame 104b. In some embodiments, the engine 118 also stores analytics output 126b for the frame 104b in the cache 122.

In some embodiments, the engine 116 accesses the frame 104c, processes at least the first slice of the frame 104c, stores the frame 104c and analytics data of the first slice of the frame 104c in the cache 122, as well as generates the analytics output 126a for the first slice of the frame 104c. Similar to the processing of the frame 104b, the engine 118 then processes the second slice of the frame 104c, and outputs (as well as store in the cache 122) the corresponding analytics output 126b for the second slice of the frame 104c. Subsequently, the engine 118 then processes the frame 104d, and outputs (as well as store in the cache 122) the corresponding analytics output 126b for the frame 104d. This process continues for each of the subsequent frames of the video, where individual frames (or slices of the frames) are processed either by the engine 116 or by the engine 118.

In some embodiments, the system 100 further comprises a video analytics combination module 128, which receives the analytics output 126a from the engine 116 and the analytics output 126b from the engine 118. The video analytics combination module 128 adds up or combines the analytics output from the two engines 116, 118, to generate final video analytics output 130. Thus, the video analytics combination module 128 collates the analytics outputs 126a, 126b from respective engines 116, 118, to create a continuous video analytics workflow, which is the final video analytics output 130. The final video analytics output 130 switches between the full-blown analytics output 126a from the analytics AI engine 116 and the analytics output 126b from the heuristic engine 118, to deliver optimal analytics results at a much lower computational burden for the overall system 100.

In FIG. 1A, the encoder 106 and the engines 116, 118 are included in the same system 100. Accordingly, the engine 116 can access the nonencoded raw RGB frames directly from the input of the encoder 106, as illustrated in FIG. 1A. However, in some embodiments, the encoder 106 can be included in a first device, and the engines 116, 118 can be included in a second separate device, as illustrated in FIG. 1B.

FIG. 1B illustrates a video analytics system 101 in which video frames are opportunistically processed by either a first computation engine 116 or by a second computation engine 118 to reduce computational burden on the video analytics system 101, without substantially sacrificing quality of video analytics, where the first and second computation engines 116, 118 do not have direct access to the video frames prior to encoding of the video frames, in accordance with an embodiment of the present disclosure. For example, the system 101 of FIG. 1B comprises a video encoder and/or transmitter device 160 (also referred to herein as device 160) and a video decoder, receiver and/or analyzer device 162 (also referred to herein as device 162). The devices 160 and 162 are two different devices, and can be co-located, located proximally, or located at different geographical locations. The device 160 includes the encoder 106 that receives nonencoded raw RGB frames 104 and outputs encoded frames 104'. The device 160 transmits the encoded frames 104' to the device 162.

The device 160 communicates with the device 162 (e.g., transmits encoded frames 104') via an appropriate wired and/or wireless medium. In some embodiments, the device 160 communicates with the device 162 via a network (not illustrated in FIG. 1B), where the network is any suitable network over which the devices 160, 162 communicate. For example, the network may be a local area network (such as a home-based or office network), a wide area network (such as the Internet), or a combination of such networks, whether public, private, or both. In some embodiments, the device 162 can be a remote, cloud-based server providing image and/or video analytics services.

In some embodiments, the device 162 of the system 101 of FIG. 1B comprises the computation engines 116, 118, the motion vector analyzer 108, and the video analytics processing module 128, similar to the system 100 of FIG. 1A. However, in FIG. 1A, the engine 116 (and optionally the engine 118) receives the raw video frames 104 from the input of the encoder 106, as the encoder 106 and the engines 116, 118 in FIG. 1A are included in the same system 100. In contrast, in the system 101 of FIG. 1B, the device 162 comprises a decoder 164 to receive the encoded video frames 104' and decode to generate the raw video frames 104—the engine 116 receives the raw video frames 104 from the output of the decoder 164. Operation of the system 101 of FIG. 1B is substantially similar to the operation of the system 100 of FIG. 1A, except for the source of the raw video frames 104 received by the engine 116.

Methodology

Figure 3:
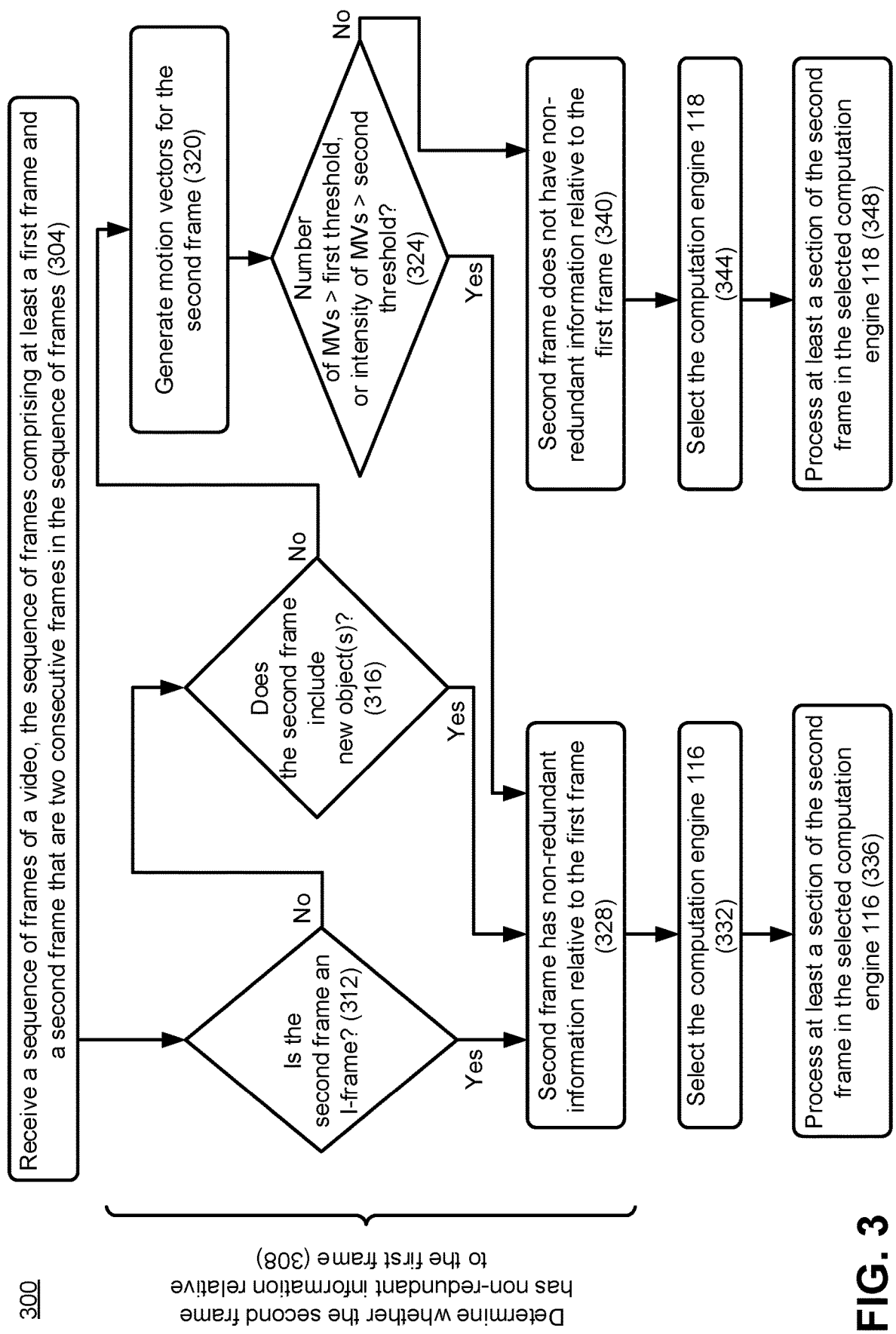
FIG. 3 is a flowchart illustrating an example method in which video frames are opportunistically processed by either a first computation engine or by a second computation engine depending on motion vector analysis, in accordance with an embodiment of the present disclosure.

FIG. 3 is a flowchart illustrating an example method 300 for operating a video analytics system (e.g., any of the systems 100 or 101 of FIGS. 1A or 1B) in which video frames are opportunistically processed by either a first computation engine (e.g., engine 116) or by a second computation engine (e.g., engine 118) to reduce computational burden on the video analytics system, without significantly sacrificing quality of the video analytics in accordance with an embodiment of the present disclosure. Method 300 can be implemented, for example, using the system architecture illustrated in FIGS. 1A and/or 1B. However other system architectures can be used in other embodiments, as apparent in light of this disclosure. To this end, the correlation of the various functions shown in FIG. 3 to the specific components and functions illustrated in FIGS. 1A and 1B is not intended to imply any structural and/or use limitations. Rather, other embodiments may include, for example, varying degrees of integration wherein multiple functionalities are effectively performed by one system. In another example, multiple functionalities may be effectively performed by more than one system.

At 300, the system (such as the motion vector analyzer 108) receives a sequence of frames of a video, the sequence of frames comprising at least a first frame and a second frame that are two consecutive frames in the sequence of frames. In some embodiments, the received sequence of video frames are in encoded form, such as encoded frames 104' discussed with respect to FIGS. 1A, 1B.

At 308, the system (such as the analyzer 108) determines whether the second frame has non-redundant information relative to the first frame. Operations of 308 are discussed using multiple blocks, as illustrated in FIG. 3. For example, blocks 312, . . . , 340 are examples of determination as to whether the second frame has non-redundant information relative to the first frame.

For example, the method 300 proceeds from block 304 to block 312, where the system (e.g., analyzer 108) determines if the second frame is an I-frame. If the second frame is an I-frame (i.e., if "Yes" at 312), the method proceeds from block 312 to block 328, where the system (e.g., the analyzer 108) determines that the second frame has non-redundant information, e.g., as discussed with respect to FIG. 2F.

If the second frame is not I-frame and is instead a P-frame or a B-frame (i.e., if "No" at 312), the method proceeds from block 312 to block 316. At 316, the system (e.g., analyzer 108) determines if the second frame includes one or more new objects. If the second frame includes any new object(s) (i.e., if "Yes" at 316), the method proceeds from block 316 to block 328, where the system (e.g., the analyzer 108) determines that the second frame has non-redundant information, e.g., as discussed with respect to FIG. 2D.

If the second frame does not include any new object (i.e., if "No" at 316), the method 300 proceeds from block 316 to block 320, where the system (e.g., the analyzer 108) generates motion vectors for the second frame. For example, the analyzer 108 extracts the motion vectors from the encoded second frame, as discussed with respect to FIGS. 2A-2D.

The method 300 then proceeds from block 320 to block 324, where the system (e.g., the analyzer 108) determines if at least one of (i) a number of the motion vectors for the second frame exceeds a first threshold value (e.g., a number threshold value), or (ii) an intensity of the motion vectors for the second frame exceeds a second threshold value (e.g., an intensity threshold value). If any one or both conditions at block 324 is/are true (i.e., if "Yes" at block 324), the method 300 proceeds from block 324 to block 328, where the system (e.g., the analyzer 108) determines that the second frame has non-redundant information, e.g., as discussed with respect to FIGS. 2B and 2C.

Referring to block 328, as discussed above, the system (e.g., analyzer 108) determines that the second frame has non-redundant information. In some examples, the entire second frame can have non-redundant information, as discussed with respect to FIGS. 2C and 2F. In some other examples, only a section of the second frame can have non-redundant information, as discussed with respect to FIGS. 2B and 2D. At 332, the system (e.g., analyzer 108) selects the computation engine 116 for processing the entire second frame (e.g., if the entire second frame has non-redundant information) or at least a section of the second frame (e.g., if only the section of the second frame has non-redundant information). At 336, the engine 116 processes the entire second frame (e.g., if the entire second frame has non-redundant information), or at least a section of the second frame (e.g., if only the section of the second frame has non-redundant information). With further reference to FIG. 3, note that if only a section of the second frame has non-redundant information and is processed by the engine 116, other sections of the second frame having redundant information can be processed by the engine 118.

Referring again to block 324, if both conditions at block 324 are not satisfied (i.e., if "No" at block 324), the method 300 proceeds from block 324 to block 340, where the system (e.g., the analyzer 108) determines that the second frame has mere redundant information, e.g., as discussed with respect to FIGS. 2A and 2E. At 344, the system (e.g., analyzer 108) selects the computation engine 118 for processing the second frame (e.g., if the entire second frame has non-redundant information) or at least a section of the second frame (e.g., if only a section of the second frame has non-redundant information). At 348, the engine 116 processes the second frame, or at least a section of the second frame.

Example System

Figure 4:
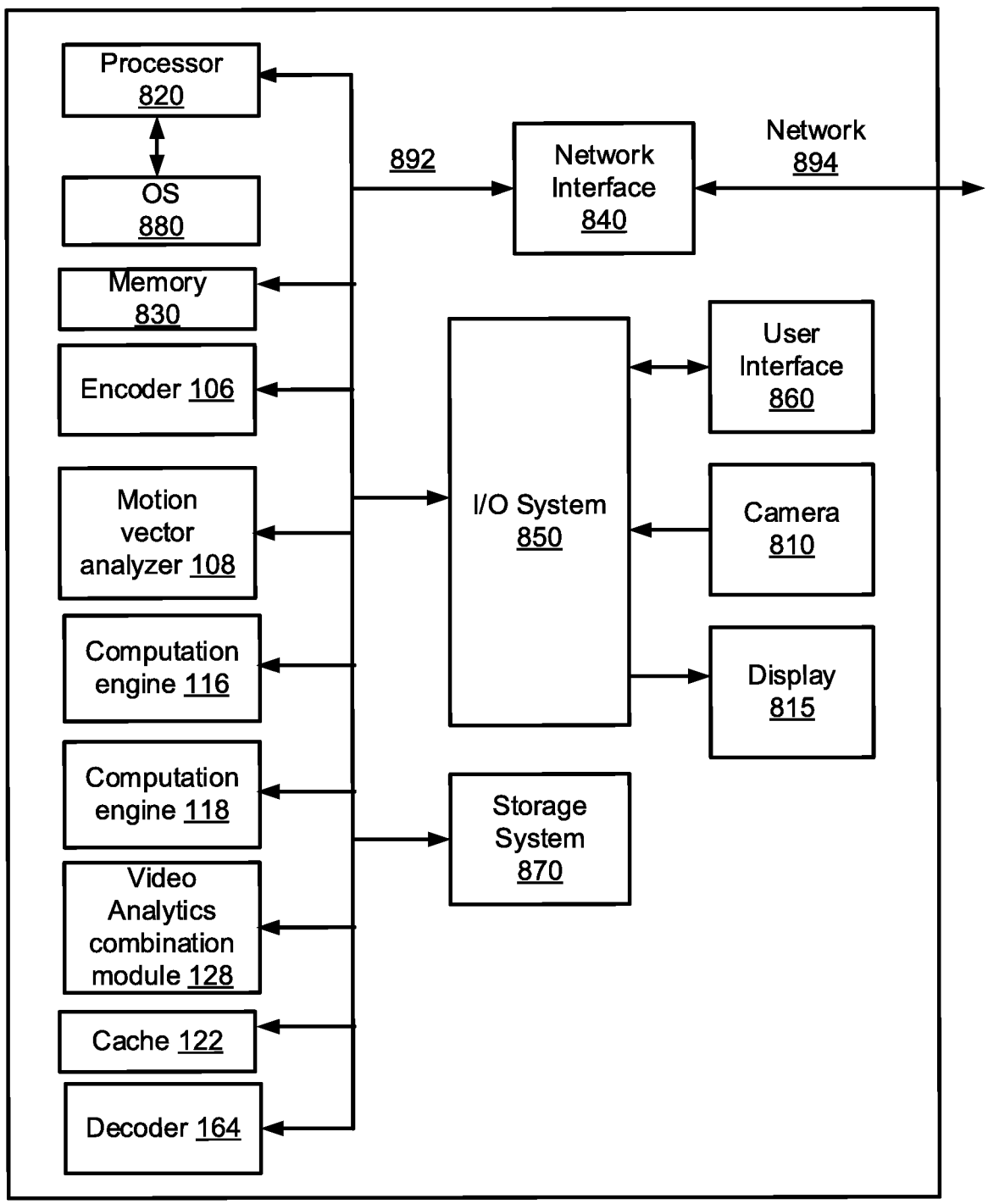
FIG. 4 illustrates an example video processing platform configured to provide opportunistic processing of individual video frames by either a first computation engine or by a second computation engine, to reduce overall computational burden, without significantly sacrificing quality of the video analytics, in accordance with an embodiment of the present disclosure.

FIG. 4 illustrates an example video processing platform 800, configured in accordance with certain embodiments of the present disclosure, to provide opportunistic processing of individual frames of a video by either a first computation engine or by a second computation engine, to reduce overall computational burden, without significantly sacrificing quality of the video analytics, in accordance with an embodiment of the present disclosure.

In some embodiments, platform 800 may be hosted on, or otherwise be incorporated into a personal computer, workstation, server system, smart home management system, laptop computer, ultra-laptop computer, tablet, touchpad, portable computer, handheld computer, palmtop computer, personal digital assistant (PDA), cellular telephone, combination cellular telephone and PDA, smart device (for example, smartphone, smart-speaker, or smart-tablet), mobile internet device (MID), messaging device, data communication device, wearable device, embedded system, and so forth. Any combination of different devices may be used in certain embodiments.

In some embodiments, platform 800 may comprise any combination of a processor 820, a memory 830, an encoder 106, a motion vector analyzer 108, computation engines 116 and 118, video analytics combination module 128, a cache 122, a decoder 164, a network interface 840, an input/output (I/O) system 850, a user interface 860, a camera 810, a display, 815, and a storage system 870. As can be further seen, a bus and/or interconnect 892 is also provided to allow for communication between the various components listed above and/or other components not shown. Platform 800 can be coupled to a network 894 through network interface 840 to allow for communications with other computing devices, platforms, devices to be controlled, or other resources. Other componentry and functionality not reflected in the block diagram of FIG. 4 will be apparent in light of this disclosure, and it will be appreciated that other embodiments are not limited to any particular hardware configuration.

Processor 820 can be any suitable processor, and may include one or more coprocessors or controllers, such as an audio processor, a graphics processing unit, or hardware accelerator, to assist in control and processing operations associated with platform 800. In some embodiments, the processor 820 may be implemented as any number of processor cores. The processor (or processor cores) may be any type of processor, such as, for example, a microprocessor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 820 may be implemented as a complex instruction set computer (CISC) or a reduced instruction set computer (RISC) processor. In some embodiments, processor 820 may be configured as an x86 instruction set compatible processor.

Memory 830 can be implemented using any suitable type of digital storage including, for example, flash memory and/or random-access memory (RAM). In some embodiments, the memory 830 may include various layers of memory hierarchy and/or memory caches as are known to those of skill in the art. Memory 830 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 870 may comprise technology to increase the storage performance enhanced protection for valuable digital media when multiple hard drives are included.

Processor 820 may be configured to execute an Operating System (OS) 880 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 800, and therefore may also be implemented using any suitable existing or subsequently-developed platform.

Network interface circuit 840 can be any appropriate network chip or chipset which allows for wired and/or wireless connection between other components of device platform 800 and/or network 894, thereby enabling platform 800 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 850 may be configured to interface between various I/O devices and other components of device platform 800. I/O devices may include, but not be limited to, user interface 860, camera 810, and display 815. Camera 810 may be configured to provide HDR images for compression processing, according to techniques disclosed herein, and display 815 may be configured to display the results of such compression processing. User interface 860 may include devices (not shown) such as a microphone, touchpad, keyboard, and mouse, etc. I/O system 850 may include a graphics subsystem configured to perform processing of images for rendering on the display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 820 or any chipset of platform 800.

It will be appreciated that in some embodiments, the various components of platform 800 may be combined or integrated in a system-on-a-chip (SoC) architecture. In some embodiments, the components may be hardware components, firmware components, software components or any suitable combination of hardware, firmware or software.

As discussed, the platform 800 comprises various components of the system 100 and/or 101 of FIGS. 1A and 1B, such as the motion vector analyzer 108, the computational engines 116, 118, the video analytics combination module 128, encoder 106, decoder 108, and/or any or all of the circuits/components illustrated in FIGS. 1A-1B, as described above. These components can be implemented or otherwise used in conjunction with a variety of suitable software and/or hardware that is coupled to or that otherwise forms a part of platform 800. These components can additionally or alternatively be implemented or otherwise used in conjunction with user I/O devices that are capable of providing information to, and receiving information and commands from, a user.

In some embodiments, these circuits may be installed local to platform 800, as shown in the example embodiment of FIG. 8. Alternatively, platform 800 can be implemented in a client-server arrangement wherein at least some functionality associated with these circuits is provided to platform 800 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 894 or remotely coupled to network 894 by one or more other networks and/or communication channels. In some cases, access to resources on a given network or computing system may require credentials such as usernames, passwords, and/or compliance with any other suitable security mechanism.

In various embodiments, platform 800 may be implemented as a wireless system, a wired system, or a combination of both. When implemented as a wireless system, platform 800 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 800 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 894. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 800 may comprise additional, fewer, or alternative subcomponents as compared to those included in the example embodiment of FIG. 8.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1. A processor-implemented method for processing video frames, the method comprising: receiving a sequence of frames of a video, the sequence of frames comprising at least a first frame and a second frame that are two consecutive frames in the sequence of frames; determining whether the second frame has non-redundant information relative to the first frame; in response to determining that the second frame has non-redundant information relative to the first frame, selecting one of a first computation engine or a second computation engine; and processing, in the selected one of the first or second computation engine, at least a section of the second frame, wherein the selected one of the first or second computation engine is computationally more intensive than the non-selected one of the first or second computation engine.

Example 2. The method of example 1, wherein determining whether the second frame has non-redundant information relative to the first frame comprises: generating a motion vector for the second frame, wherein the motion vector is indicative of movement of an object in the second frame relative to the first frame; comparing one or more attributes of the motion vector to corresponding one or more threshold values; and in response to the comparing, determining whether the second frame has non-redundant information relative to the first frame.

Example 3. The method of example 2, wherein determining whether the second frame has non-redundant information relative to the first frame comprises: in response to a number of motion vectors exceeding a threshold value, determining that the second frame has non-redundant information relative to the first frame.

Example 4. The method of example 3, wherein selecting one of the first computation engine or the second computation engine comprises: determining that the motion vectors are confined to a first region of the second frame, wherein a second region of the second frame does not include the motion vectors; identifying a first portion of the second frame comprising the first region, and a second portion of the second frame comprising the second region; and selecting (i) the first computation engine for processing at least the first portion of the second frame and (ii) the second computation engine for processing at least the second portion of the second frame.

Example 5. The method of any of examples 2-4, wherein determining whether the second frame has non-redundant information relative to the first frame comprises: in response to an intensity of the motion vector exceeding a threshold value, determining that the second frame has non-redundant information relative to the first frame.

Example 6. The method of any of examples 2-5, wherein determining whether the second frame has non-redundant information relative to the first frame comprises: in response to at least one of (i) an intensity of the motion vector exceeding a first threshold value or (ii) a number of multiple motion vectors exceeding a second threshold value, determining that the second frame has non-redundant information relative to the first frame.

Example 7. The method of any of examples 2-6, further comprising: in response to both (i) an intensity of the motion vector being less than a first threshold value and (ii) a number of motion vectors being less than a second threshold value, determining that the second frame does not include non-redundant information relative to the first frame.

Example 8. The method of any of examples 2-7, wherein individual frames in the sequence are encoded, and wherein generating the motion vectors comprises: extracting, from the encoded second frame, the motion vectors, wherein processing at least the section of the second frame comprises processing at least the section of the second frame that has one of (i) been decoded, or (ii) not been previously encoded.

Example 9. The method of any of examples 1-8, wherein determining whether the second frame has non-redundant information relative to the first frame comprises: identifying a new object in the second frame that is absent in the first frame; and in response to identifying the new object in the second frame, determining that the second frame has non-redundant information relative to the first frame.

Example 10. The method of any of examples 1-9, wherein determining whether the second frame has non-redundant information relative to the first frame comprises: identifying that the second frame is an I-frame; and in response to identifying that the second frame is an I-frame, determining that the second frame has non-redundant information relative to the first frame.

Example 11. The method of any of examples 1-10, wherein the first computation engine is more computationally intensive than the second computation engine when processing a frame, and wherein selecting one of the first computation engine or the second computation engine comprises: in response to determining that the second frame has non-redundant information relative to the first frame, selecting the first computation engine to process at least a section of the second frame.

Example 12. The method of example 11, wherein: the first computation engine comprises one or more neural network modules trained to perform one or more image and/or video processing tasks; and the second computation engine comprises one or more heuristics-based modules configured to perform one or more image and/or video processing tasks.

Example 13. The method of any of examples 1-12, wherein determining whether the second frame has non-redundant information relative to the first frame comprises: determining, by a trained neural network model, whether the second frame has non-redundant information relative to the first frame.

Example 14. At least one non-transitory machine-readable storage medium having instructions encoded thereon that, when executed by one or more processors, cause a process to be carried out for processing video frames, the process comprising: receiving a sequence of frames of a video, the sequence of frames comprising at least a first frame and a second frame that are two consecutive frames in the sequence of frames; generating a motion vector for the second frame, wherein the motion vector is indicative of movement of an object in the second frame relative to the first frame; comparing one or more attributes of the motion vector to corresponding one or more threshold values; in response to the comparing, selecting one of a first computation engine or a second computation engine, wherein one of the first or second computation engine is computationally more intensive than the other of the first or second computation engine; and processing, in the selected one of the first or second computation engine, at least a section of the second frame.

Example 15. The computer readable storage medium of example 14, wherein comparing one or more attributes of the one or more motion vectors to corresponding one or more threshold values comprises: comparing at least one of (i) a number of motion vectors to a first threshold value, and (ii) an intensity of the motion vector to a second threshold value.

Example 16. The computer readable storage medium of example 15, wherein selecting one of the first computation engine or the second computation engine comprises: in response to at least one of (i) the number of the motion vectors exceeding the first threshold value or (ii) the intensity of the motion vector exceeding the second threshold value, selecting the first computation engine for processing at least the section of the second frame.

Example 17. The computer readable storage medium of example 15, wherein selecting one of the first computation engine or the second computation engine comprises: in response to each of (i) the number of the motion vectors being lower than the first threshold value and (ii) the intensity of the motion vector being lower than the second threshold value, selecting the second computation engine for processing at least the section of the second frame.

Example 18. A system for optimizing operation of a first computation engine and a second computation engine, the system comprising: a first computation engine; a second computation engine, wherein the first computation engine is computationally intensive relative to the second computation engine when processing a frame of a video; and a motion vector analyzer to (i) receive a sequence of frames of a video that comprises at least a first frame and a second frame, (ii) determine whether the second frame has non-redundant information relative to the first frame, and (iii) select the first computation engine, in response to determining that the second frame has non-redundant information relative to the first frame, wherein the first computation engine is to, in response to the selection, process at least a section of the second frame.

Example 19. The system of example 18, wherein: the sequence of frames of the video further comprises a third frame and a fourth frame that are two consecutive frames of the video; and the motion vector analyzer is to (i) determine whether the fourth frame has non-redundant information relative to the third frame, and (iii) select the second computation engine, in response to determining that the fourth frame does not include non-redundant information relative to the third frame, wherein the second computation engine is to, in response to the selection of the second computation engine, process at least a section of the fourth frame.

Example 20. The system of example 18 or 19, wherein: the first computation engine comprises one or more neural network modules trained to perform one or more image and/or video processing tasks; the second computation engine comprises one or more heuristics-based modules configured to perform one or more image and/or video processing tasks; and the motion vector analyzer comprises a neural network model trained to determine whether a frame has non-redundant information relative to another frame.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for processing video frames, the method comprising:
    receiving a sequence of frames of a video, the sequence of frames including at least a first frame and a second frame that are two consecutive frames in the sequence of frames;
    obtaining a motion vector for the second frame, the motion vector indicative of movement of an object in the second frame relative to the first frame;
    comparing one or more attributes of the motion vector to corresponding one or more threshold values;
    selecting, based on a result of the comparing, one of a first computation engine or a second computation engine; and
    processing, in the selected one of the first or second computation engine, at least a section of the second frame, the selected one of the first or second computation engine computationally more intensive than the non-selected one of the first or second computation engine.

2. The method of claim 1, further including:
    determining, based on the comparing, whether the second frame has non-redundant information relative to the first frame.

3. The method of claim 2, wherein the determining of whether the second frame has non-redundant information relative to the first frame includes:
    in response to a number of motion vectors exceeding a threshold value, determining that the second frame has non-redundant information relative to the first frame.

4. The method of claim 3, wherein the selecting of one of the first computation engine or the second computation engine includes:
    determining that the motion vectors are confined to a first region of the second frame, wherein a second region of the second frame does not include the motion vectors;
    identifying a first portion of the second frame including the first region, and a second portion of the second frame including the second region; and
    selecting (i) the first computation engine for processing at least the first portion of the second frame and (ii) the second computation engine for processing at least the second portion of the second frame.

5. The method of claim 2, wherein the determining of whether the second frame has non-redundant information relative to the first frame includes:
    in response to an intensity of the motion vector exceeding a threshold value, determining that the second frame has non-redundant information relative to the first frame.

6. The method of claim 2, wherein the determining of whether the second frame has non-redundant information relative to the first frame includes:
    in response to at least one of (i) an intensity of the motion vector exceeding a first threshold value or (ii) a number of multiple motion vectors exceeding a second threshold value, determining that the second frame has non-redundant information relative to the first frame.

7. The method of claim 2, further including:
    in response to both (i) an intensity of the motion vector being less than a first threshold value and (ii) a number of motion vectors being less than a second threshold value, determining that the second frame does not include non-redundant information relative to the first frame.

8. The method of claim 2, wherein individual frames in the sequence are encoded, and obtaining the motion vector includes:
    extracting, from the encoded second frame, the motion vector,
    wherein the processing of at least the section of the second frame includes processing at least the section of the second frame that has one of (i) been decoded, or (ii) not been previously encoded.

9. The method of claim 2, wherein the determining of whether the second frame has non-redundant information relative to the first frame includes:
    identifying a new object in the second frame that is absent in the first frame; and
    in response to the identifying of the new object in the second frame, determining that the second frame has non-redundant information relative to the first frame.

10. The method of claim 2, wherein the determining of whether the second frame has non-redundant information relative to the first frame includes:
    identifying that the second frame is an I-frame; and
    in response to the identifying that the second frame is an I-frame, determining that the second frame has non-redundant information relative to the first frame.

11. The method of claim 2, wherein the first computation engine is more computationally intensive than the second computation engine when processing a frame, and the selecting of one of the first computation engine or the second computation engine includes:
    in response to determining that the second frame has non-redundant information relative to the first frame, selecting the first computation engine to process at least the section of the second frame.

12. The method of claim 11, wherein:
    the first computation engine includes one or more neural network modules trained to perform one or more image and/or video processing tasks; and
    the second computation engine includes one or more heuristics-based modules configured to perform one or more image and/or video processing tasks.

13. The method of claim 2, wherein determining whether the second frame has non-redundant information relative to the first frame includes:
  determining, by a trained neural network model, whether the second frame has non-redundant information relative to the first frame.

14. At least one non-transitory machine-readable storage medium comprising instructions encoded thereon that, when executed by one or more processors, cause the one or more processors to at least:
  receive a sequence of frames of a video, the sequence of frames comprising at least a first frame and a second frame that are two consecutive frames in the sequence of frames;
  generate a motion vector for the second frame, wherein the motion vector is indicative of movement of an object in the second frame relative to the first frame;
  compare one or more attributes of the motion vector to corresponding one or more threshold values;
  in response to the comparison, select one of a first computation engine or a second computation engine, wherein one of the first or second computation engine is computationally more intensive than the other of the first or second computation engine; and
  process, in the selected one of the first or second computation engine, at least a section of the second frame.

15. The at least one machine-readable storage medium of claim 14, wherein the instructions are to cause the one or more processors to:
  compare at least one of (i) a number of motion vectors to a first threshold value, or (ii) an intensity of the motion vector to a second threshold value.

16. The at least one machine-readable storage medium of claim 15, wherein to select one of the first computation engine or the second computation engine, the instructions are to cause the one or more processors to:
  in response to at least one of (i) the number of the motion vectors exceeding the first threshold value or (ii) the intensity of the motion vector exceeding the second threshold value, select the first computation engine for processing at least the section of the second frame.

17. The at least one machine-readable storage medium of claim 15, wherein to select one of the first computation engine or the second computation engine, the instructions are to cause the one or more processors to:
  in response to each of (i) the number of the motion vectors being lower than the first threshold value and (ii) the intensity of the motion vector being lower than the second threshold value, select the second computation engine for processing at least the section of the second frame.

18. A system for optimizing operation of a first computation engine and a second computation engine, the system comprising:
  a first computation engine;
  a second computation engine, wherein the first computation engine is computationally more intensive relative to the second computation engine when processing a frame of a video; and
  a motion vector analyzer to (i) receive a sequence of frames of a video that includes at least a first frame and a second frame, (ii) obtain a motion vector for the second frame, the motion vector indicative of movement of an object in the second frame relative to the first frame, and (iii) select the first computation engine based on comparison of one or more attributes of the motion vector to corresponding one or more threshold values,
  wherein the first computation engine is to, in response to the selection, process at least a section of the second frame.

19. The system of claim 18, wherein:
  the sequence of frames of the video further includes a third frame and a fourth frame that are two consecutive frames of the video; and
  the motion vector analyzer is to (i) determine whether the fourth frame has non-redundant information relative to the third frame, and (iii) select the second computation engine, in response to determining that the fourth frame does not include non-redundant information relative to the third frame,
  wherein the second computation engine is to, in response to the selection of the second computation engine, process at least a section of the fourth frame.

20. The system of claim 18, wherein:
  the first computation engine includes one or more neural network modules trained to perform one or more image and/or video processing tasks;
  the second computation engine includes one or more heuristics-based modules configured to perform one or more image and/or video processing tasks; and
  the motion vector analyzer includes a neural network model trained to determine whether a frame has non-redundant information relative to another frame.

* * * * *